United States Patent [19]

Isbister

[11] 3,806,922
[45] Apr. 23, 1974

[54] MARINE RADIO INTERROGATOR-TRANSPONDER TARGET DETECTION, IDENTIFICATION, AND RANGE MEASUREMENT SYSTEM

[75] Inventor: Eric J. Isbister, Charlottesville, Va.

[73] Assignee: Sperry Rand Corporation, New York, N.Y.

[22] Filed: June 26, 1972

[21] Appl. No.: 266,172

[52] U.S. Cl. .............. 343/6.5 LC, 325/6, 325/55, 340/167 B
[51] Int. Cl. ............................................. G01s 9/56
[58] Field of Search ......... 343/5 DP, 6.5 R, 6.5 LC, 343/6.8 R, 6.8 LC; 340/167 R, 167 B, 345; 325/6, 55; 179/15 BA

[56] References Cited
UNITED STATES PATENTS

| 2,973,509 | 2/1961 | Majerus et al. | 340/345 |
| 3,412,400 | 11/1968 | Aker | 343/5 DP X |
| 3,341,845 | 9/1967 | Deman | 343/6.5 LC |
| 3,403,381 | 9/1968 | Haner | 340/167 R X |

Primary Examiner—T. H. Tubbesing
Attorney, Agent, or Firm—Howard P. Terry

[57] ABSTRACT

A marine radio beacon transponder navigation and collision avoidance system provides facilities for early detection of, identification of, and communication with cooperating marine vessels. For these purposes, own ship may call a specific second ship or a shore based transponder, the called transponder returning only the coded message it received. Own ship may call a specific second ship causing an alarm to call the ship master to a radio-telephone, the identical coded message being re-radiated. A general coded call may be transmitted by own ship only to all other ships in radio range but not to shore transponders, the reply then being returned from each answering ship with the coded identification of that ship.

23 Claims, 17 Drawing Figures

MARINE RADIO INTERROGATOR-TRANSPONDER TARGET DETECTION, IDENTIFICATION, AND RANGE MEASUREMENT SYSTEM

BACKGROUND OF THE INVENTION

1. Field of the Invention

The invention pertains to an integrated radio detection, navigation, and communication system for cooperatively affording safe navigation at sea and more particularly relates to a radio beacon communication system for use between cooperating vessels or shore stations, permitting early detection and identification of shore stations and of intruding vessels such as may follow dangerous courses relative to own ship.

2. Description of the Prior Art

The annual increase in marine traffic density, in the size and speed of ships, and in their earning power per unit of time is increasing the need for ship's masters to have complete awareness at all times of the presence of other ships, including small ones, at greater and greater distances from own ship. There is also a growing need for positive identification of such vessels and for improved methods of navigation and piloting so that marine traffic may move during poor weather conditions and poor visibility, yet with improved safety. Improved flow of information is desired not only between ships, but also between ships and the installations of shore authorities designed to control vessel traffic with the same goals of increased flow and improved safety. There has long been recognized an increasing need to achieve such goals in an inexpensive manner requiring the use of only a single integrated device on ship board.

In the past, the principal aid to the ship's navigator and to the shore-based operator carrying out these functions has been radar, both shipboard and shore based. Radar suffers from a number of limitations which must be overcome if the above goals are to be achieved. One of them lies in the inability of radar to detect other ships, particularly small ones, in high seas and in other inclement weather conditions just when the information is most needed. The radar picture is often cluttered with sea and rain echoes which mask wanted target returns. While conventional radar instruments have been of assistance in ship navigation and in collision avoidance, the typical radar presentation is not always easy to interpret in bad weather. Increased time is required to comprehend the general situation, to recognize moving targets and other hazards, and then to select a course and speed for gaining safe passage through a dynamic neighborhood pattern. While rather complex computer and display devices of some merit have been proposed for performing this function, there has long been a need for a simple and reliable solution to navigation and recognition problems associated with prior art radar systems.

A need is additionally present for reliable communication between ships and between ship and shore facilities and has been satisfied to an extent by installation of bridge-to-bridge radio-telephone devices for the exclusive use of the ship's officers in connection with ship's navigation and safety matters. However, the only means available in the prior art to either the ship or the shore facility to provide knowledge of the presence and location of other vessels is radar; radar returns from ships look generally alike and there is no simple, positive, and rapid way to distinguish the display image of one ship from another.

Early warning of the presence of an intruding vessel, its identification, and communication with it are requisites for the prevention of accidents between vessels, especially in crowded traffic and in the instance of ships having limited maneuverability. Because of their great momentum, large cargo vessels are slow to respond to applied rudder or to propeller thrust. Such vessels travel large distances before appreciable changes in course or speed can be effected. The greater the tonnage of the vessel or the greater its speed, the greater is that distance. On the other hand, at the reduced speeds often used in heavy traffic or in restricted navigation areas, the ship's controls may become even less effective. Because of the unwieldy nature of the supership and of the natural desire of all ship masters to keep their ships moving even under conditions of poor visibility, it is necessary particularly in harbors, estuaries, and other narrow waters that traffic move in orderly patterns and follow definite, precise routes. For this to be done safely and successfully, improved means of ship position fixing are necessary.

Some improvement directed along a promising approach has been achieved in the prior art through the use of traditional radar-beacon combinations of the general type described by Roberts in *Radar Beacons:* McGraw-Hill Book Company (1947), which is Volume 3 of the Radiation Laboratory Series. However, a major disadvantage of such systems has been connected with serious mutual interference situations when large numbers of interrogations are made in the same general time period. Saturating responses are generated when a large number of beacon replies obscure the radar or other navigation display, degrading distinguishability of the elements of the display. The unsynchronized repetition frequencies of different interrogators is a serious source of dynamic clutter in the display. In general, the more ships there are with prior art radar-beacon systems in the vicinity of own ship, the worse these types of clutter become, the adverse situation again resulting just when reliable detection, identification, and communication are most needed by the ship's master.

SUMMARY OF THE INVENTION

The present invention relates to improved radio navigation and marine piloting equipment of unitary nature providing improved target detection, positive target identification, and precise range measurement for safe navigation in pilotage waters. The invention involves the use of cooperating transponder-interrogator beacons which may be ship-borne or additionally mounted on fixed obstacles for navigation and collision avoidance purposes. The invention may also be used cooperatively with radar systems of the type conventionally used for marine navigation purposes.

The invention overcomes the several disadvantages inherent in pilotage when using only a conventional marine radar system and additionally is free of susceptibility to mutual interference and other operational problems associated with prior art radar-beacon navigation systems. The invention makes feasible early target detection, positive target identification, and precision target range measurement not provided by prior art radio navigation systems.

DESCRIPTION OF THE PREFERRED EMBODIMENTS

The novel marine radio interrogator-transponder target detection, identification, and range measurement system may be fitted on small vessels not normally equipped with a radar system, or on radar equipped ships and, in a simplified form, may be employed as a shore beacon or at other fixed position hazards.

Figure 2A:
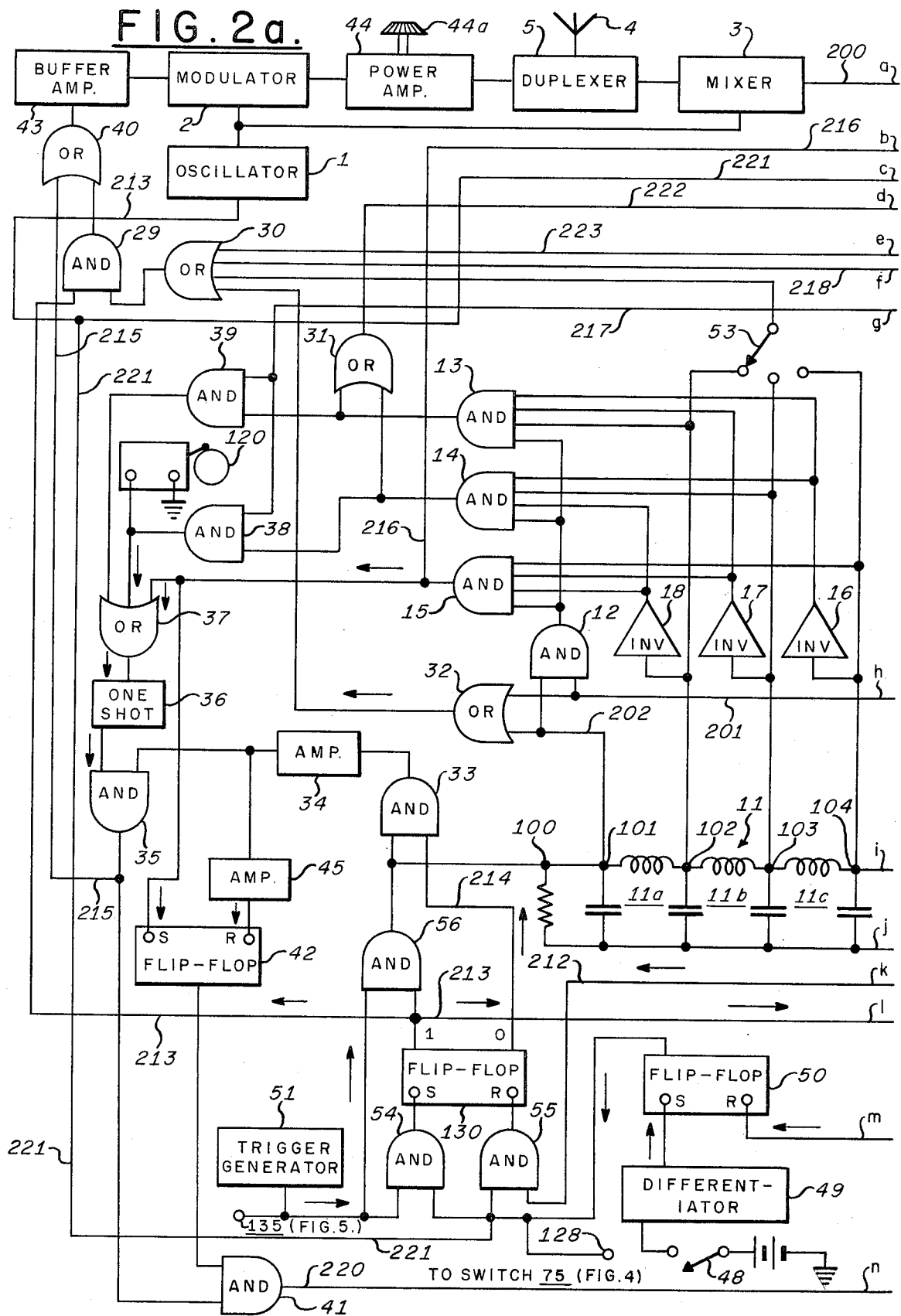
FIGS. 2a, 2b, and 2c illustrate a preferred form of the invention showing the electrical interconnections of its elements.
Figure 2B:
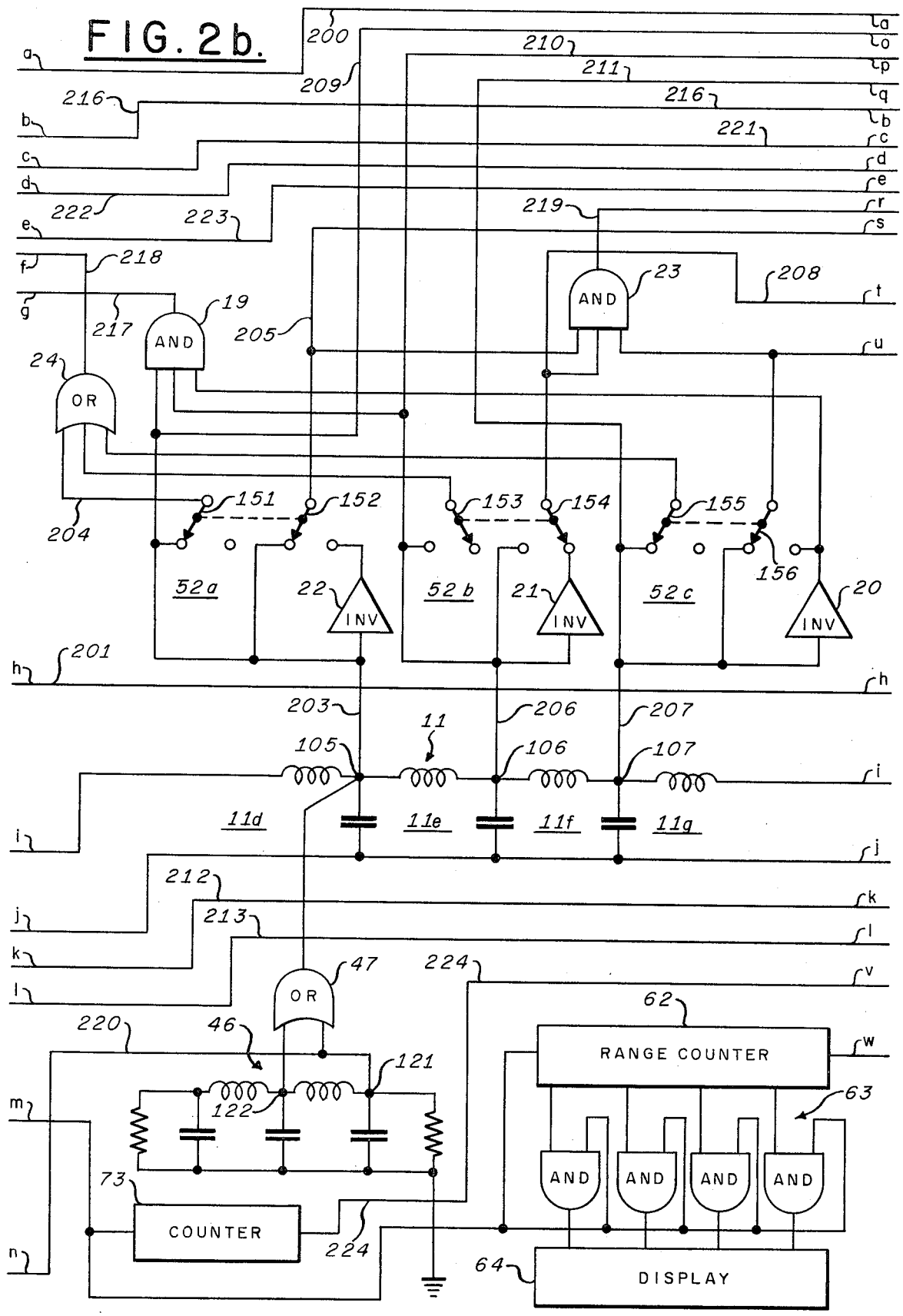
Figure 2C:
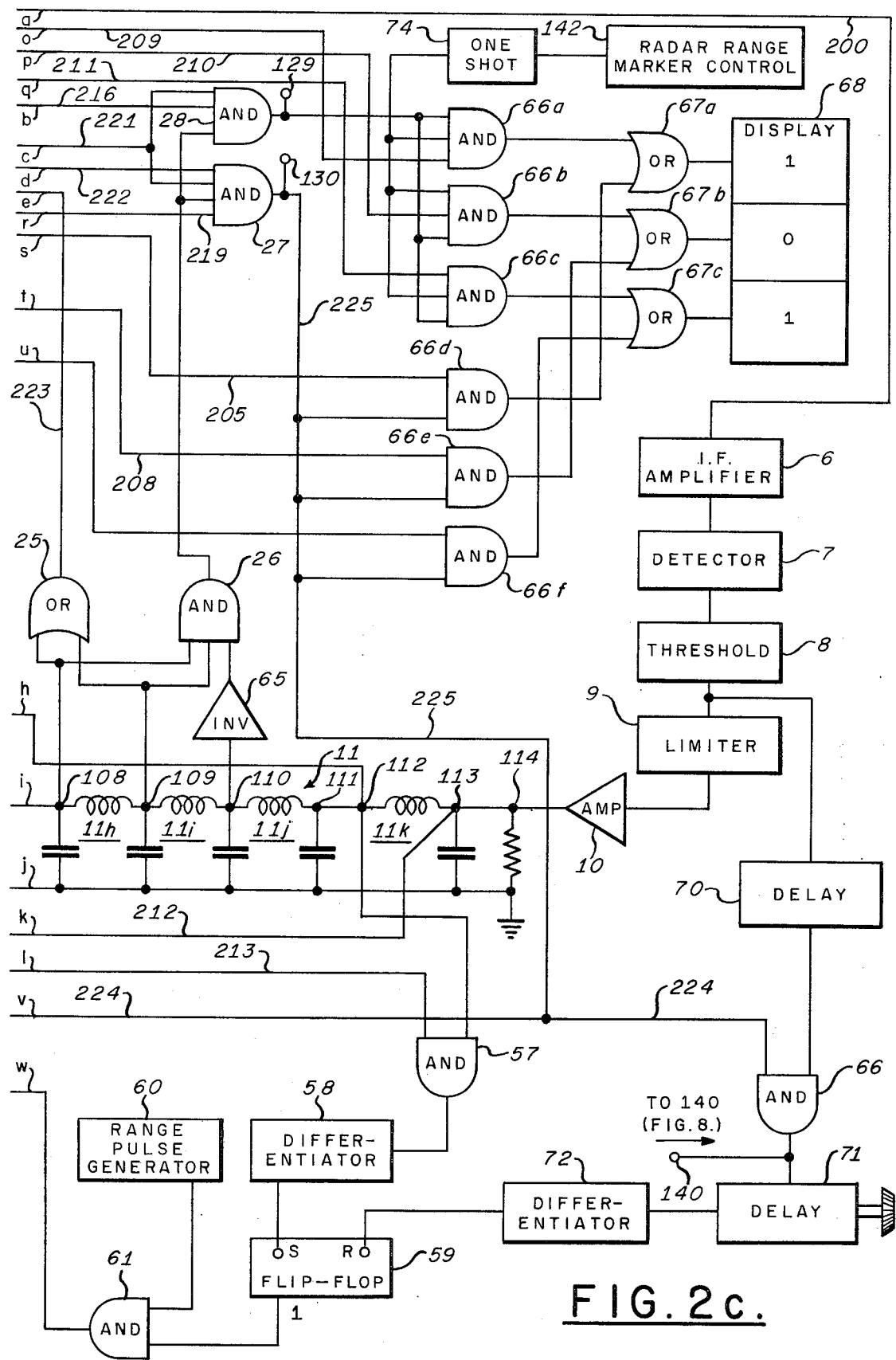

In presenting the invention, it will be convenient first to discuss it in terms of novel beacon transponder-interrogator equipment located, for example, on own ship, and which may be identified as located at Station C. Similar beacon transponder-interrogators may be present at other locations, such as aboard other ships or at stationary locations marked for navigation or collision avoidance purposes. A representative one of the latter locations will be discussed, and may be identified as the called ship or Station A. It will, of course, be recognized by those skilled in the art that radar systems may be operated cooperatively with either or both Station A or Station C. In the major part of the discussion, it will be assumed that the Station A and C equipments are substantially similar, and the discussion will be particularly in terms of the structure and operation of the equipment located at the calling Station C and as illustrated in FIGS. 2a, 2b, and 2c.

In communicating between Stations A and C according to the invention, it will be remembered that interrogations are always made on a particular carrier frequency $f_1$ and that a responding transponder will always radiate a carrier $f_2$ such that $f_1 - f_2$ equals a convenient intermediate frequency $f_{i.f.}$. This choice of frequency relations permits important simplicity and other advantages in the design and operation of the invention, as will be explained.

Figure 1A:
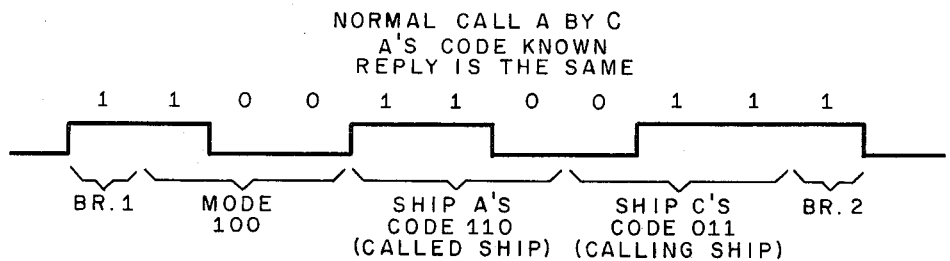
FIGS. 1a, 1b, 1c, and 1d are graphs of codes useful in explaining one mode of operation of the invention.

A further set of rules employed advantageously by the invention is illustrated in FIGS. 1a, 1b, 1c, and 1d. As is seen in FIG. 1a, for example, each message consists of five parts:

1. a first or bracketing pulse BR. 1 which indicates the start of a message,
2. a first group of bits that describes the mode of operation of the calling station (Station A is called by Station C, ring ship A's bell, CQ call, or reply to CQ),
3. a second group of bits which represents the called ship's code,
4. a third group of bits which represents the calling ship's code, and
5. a final bracketing pulse BR. 2 to mark the end of the message.

So as to keep the drawings reasonably simple and the explanation of the invention clear, relatively simple codes will be illustrated for use as the mode code, the called ship's code, and the calling ship's code. While it will be clear to those skilled in the art that more bits may be used for each of the code groups, the invention will be illustrated as using three bits for each of the listed code groups.

Thus, FIG. 1a represents a bit sequence when Station A is called by Station C; the same progression is used when Station A acknowledges Station C's call. For example, the sequence used includes the first bracket pulse BR. 1 and the mode code group 100, where 100 is arbitrarily taken to mean that Station C is calling a particular station identified by a known code; in this example, Station C is calling Station A with the known code 110. This call, which will be referred to in the present example as the normal call, additionally includes the Station A code, arbitrarily represented as 110 and Station C's code, arbitrarily represented as 011 by way of example. Then, the final bracketing pulse BR. 2 appears at the message end.

Figure 1B:
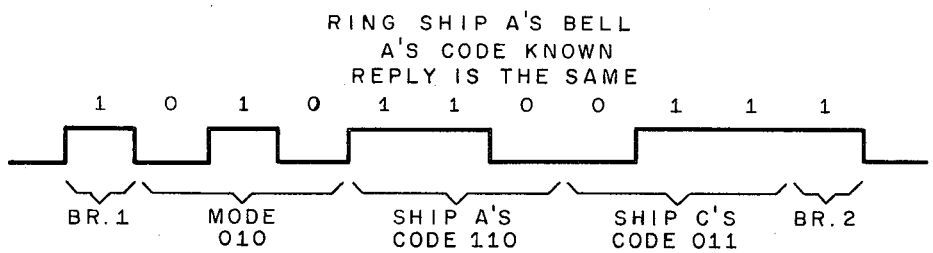

If Station C with its identifying code 011 wishes to call a station with a known code, such as Station A with its identifying code 110 and also to sound an alarm at Station A signifying that the navigator should attend the bridge-to-bridge or other radio-telephone, the mode code at Station C is arbitrarily changed from 100 to 010 as shown in FIG. 1b. The remainder of the message is the same as in FIG. 1a.

Figure 1C:
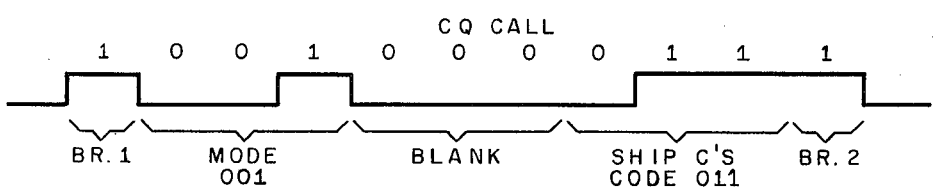
Figure 1D:
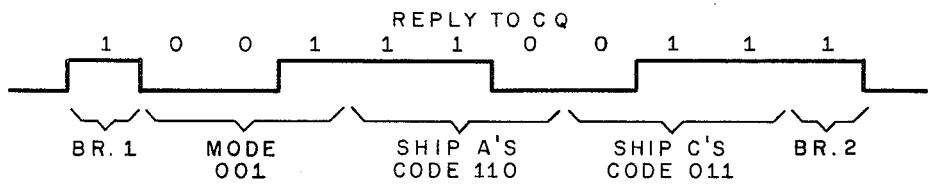

If Station C, which has the identifying code 011, wants to call all cooperating beacon systems according to the invention in the vicinity, the CQ call of FIG. 1c is used. After the bracket pulse BR. 1, the mode code 001 is transmitted, arbitrarily indicating the CQ mode. As the CQ call is a general call, no specific called station is desired, so that the next three bits are 000. The calling ship's code 011 is then transmitted, and, finally, the final bracket pulse BR. 2. The reply to a CQ call, as in FIG. 1d, is similar but, instead of the 000 transmission following the mode code 001, Station A's code 110 is transmitted should Station A answer.

Thus, there are three primary modes of operation of the system. For example, one ship may call a specific second ship or a shore-based transponder whose code is known. This is the usual or normal call situation. The called transponder's code must be known and only the called transponder will respond by returning exactly the message it received.

A second of the primary modes of operation is similar to the first except that the mode code may arbitrarily be 010 instead of 100, this special bit group causing an alarm at the called transponder to notify the watch officer there that he should make use of a communication channel such as a standard marine radio-phone. This call may be called the ring-the-bell call. The reply to it is identical to the calling message. Shore navigation beacons are arranged not to reply.

The third of the primary modes of operation is the general CQ mode, using 001 as a mode code instead of 100 or 010. The CQ mode is used when the called ship's code is not known. The message goes out with the called ship's code replaced by 000. Shore navigational beacons are arranged not to reply, but all transponders on vicinal ships are caused to respond. Each replying transponder substitutes its own identifying three-bit code for the 000 code of the interrogating message. In all instances, an interrogating station will accept only replies that place its code just before the bracket code BR. 2.

For all types of operation, the apparatus normally stands by as a transponder. Interrogations are made by manual operation of an activating switch button and the device returns automatically to its stand by status at completion of each of its interrogations.

As previously noted, the invention will be discussed in one form as being located at Station A or on the answering Ship A and as being interrogated by a similar system located on the calling Ship C or shore or other Station C. As before, the structure and function of the apparatus will be explained by the arbitrary choice in which Station A's identifying code is 110, while Station C's identifying code is 011. It is apparent that a wide variety of other multiple-bit codes may be used in the system.

In FIG. 2a, the Station A antenna 4 is a conventional microwave omnidirectional beacon antenna of the type having a relatively uniform radiation pattern extending generally horizontally above the earth's surface. Such antennas are tripole linear arrays, generally co-axially fed, or slotted wave guides and are well known in the art for use in beacon and other communication systems where relatively large band width operation is desired.

Antenna 4 of FIG. 2a is coupled to a conventional duplexer 5 having second and third ports coupled respectively to the adjustable power amplifyer 44 and mixer 3. Power amplifier 44 is excited by the system high frequency source 1, which latter may take the form of a conventional diode oscillator, for example. Modulator 2 is interposed between oscillator 1 and power amplifier 44 to modulate the carrier frequency of oscillator 1 in conformance with the message from buffer amplifier 43. Oscillator 1 is arranged to produce either of the two carrier waves of stable frequencies $f_1$ and $f_2$ spaced apart by an appropriate intermediate frequency $f_{i.f.}$. The waves $f_1$ and $f_2$ are provided by master oscillator 1 in a conventional manner, and the generation of carrier frequencies $f_1$ or $f_2$ is controlled by the signal voltage from flip-flop 50. Only one of the signals $f_1$ or $f_2$ is provided at any one time to the conventional duplexer 5.

The high frequency signal supplied by master oscillator 1 is simultaneously supplied to one input of a conventional high frequency mixer 3. The intermediate frequency $f_{i.f.}$ generated by mixer 3 in the presence of a received signal is the difference frequency $f_1 - f_2$. This relation is a significant one in the novel radio system, since it permits use of simple and compact equipment at Stations A and C by having all interrogations made on carrier frequency $f_1$ and all transponder replies made on the second carrier $f_2$. Signal $f_{i.f.}$ is supplied via lead 200 to the i.f. amplifier 6 of FIG. 2c, the output of amplifier 6 being detected by detector 7 and then subjected to the action of a conventional threshold circuit 8 before use in the system.

In the stand by situation when the invention is operating in the transponder mode, master oscillator 1 continuously supplies the carrier frequency $f_2$ to transmitter modulator 2 and to the receiver mixer 3. Consider that these events are happening at Ship or Station A. Should an incoming Call A interrogation, including the mode code 100 of FIG. 1a on carrier frequency $f_1$, be received from Ship or Station C by antenna 4 and be passed through the duplexer device 5 to mixer 3, it is mixed with signal $f_2$ from master oscillator 1 to produce the intermediate frequency $f_{i.f.}$. After amplification in i.f. amplifier 6 of FIG. 2c and detection by detector 7, it is operated upon by threshold circuit 8. An output will be produced by circuit 8 only if the input amplitude exceeds a predetermined value. The signal is then applied to the conventional soft limiter 9 of FIG. 2c so that peaks are clipped. After amplification by amplifier 10, the received signal has the characteristics of the Call A by C code of FIG. 1a, for example.

The signal is then applied to an end section of the regularly tapped delay device 11, which delay device extends through FIGS. 2a, 2b, and 2c and is a central signal propagating element of the system. Made up, for example, of regular delay line sections 11a through 11k, it may receive signals from processing at either of its ends, as will be seen. The FIG. 1a signal enters delay line 11 at junction 114 which is common with the end tap 113 of FIG. 2c and propagates toward the left end of the delay line in FIG. 2a. Nothing happens until the leading pulse of FIG. 1a (bracket pulse BR. 1) reaches tap 101 in FIG. 2a of delay line 11. At precisely the same instant of time, the last or bracket pulse of FIG. 1a (pulse BR. 2) reaches tap 112 of delay line 11.

Taps 101 and 112 are respectively coupled to coincidence device or AND gate 12 (FIG. 2a) via leads 201, 202. Thus, the bracket pulses BR. 1 and BR. 2 arrive at coincidence or AND gate 12 simultaneously and AND gate 12 conducts for the simultaneous intervals of the bracket pulses, indicating that a complete call has been received.

In the received signal processing system, other groups of sections of the delay line 11 play particular roles. For example, taps 102, 103, 104 are associated with the processing of a mode code, taps 105, 106, 107 with the processing of the Ship or Station A or C code, and taps 108, 109, 110, and 111 with the processing the Ship or Station A or C code. Each set of taps is coupled into circuit arrangements for processing the respective code groups.

At the same instant of time that the bracket pulses BR. 1 and BR. 2 cause AND gate 12 to conduct, the leading edge of the first bit of the mode code group of FIG. 1a reaches tap 102 of delay device 11. In the typical instance in which the mode code 100 is taken to illustrate the mode of operation of the system, the signals at the associated taps 103 and 104 remain zero. Now taps 104, 103, and 102 are coupled respectively through inverting amplifiers 16, 17, 18 (FIG. 2a) and each inverter has at least two outputs coupled to a respective one of quadruple input coincidence or AND gates 13, 14, and 15. Taps 102, 103, and 104 of delay line 11 are also directly connected to inputs of the respective AND or coincidence gates 13, 14, and 15.

The AND gates 13, 14, or 15 open or conduct only when all of their respective inputs are at the same 1 level, as representing the 1 state of bits of the incoming message. The direct electrical leads from the delay line taps 102, 103, and 104 to the respective AND gates 13, 14, or 15 convey a signal of the 1 level only when a 1 in the code is present at a respective tap of delay line 11. The inverted outputs of the respective inverters 16, 17, and 18 convey a 1 level to a corresponding AND gate only when there is a zero level at the corresponding tap of delay line 11.

For example, for the 100 mode code, there will be a 1 at tap 102 and zero levels at taps 103 and 104. The 1 level at tap 102 is supplied only to AND gate 13. As the inverters 16 and 17 respectively invert their inputs, the zero levels at taps 103 and 104 are converted to 1 levels at AND gate 13 (the normal call AND gate), and only AND gate 13 conducts. The AND gates 14 and 15, having been supplied with zero levels from the respective delay line taps 104 and 103, do not conduct.

In greater detail, the four inputs to AND gate 13 are supplied by the output of the bracket pulse AND gate 12, inverters 16 and 17, and direction from tap 102 of delay line 11. The AND gate 13 provides an output to AND gate 39 and also to OR gate 31. The output of OR gate 31 is blocked by the open AND gate 27 (FIG. 2c) and is therefore not used in the transponder mode of the system.

The second input to AND gate 39 is derived from AND gate 19 (FIG. 2b) via lead 217. By definition of the normal call of FIG. 1a, only a called ship (Ship A whose code 110 matches the code of the next three bits of the calling message) will reply. This recognition is performed by AND gate 19; one input to AND gate 19 is permanently connected directly to tap 105 of delay line 11, requiring a 1 level in the call message at tap 105 to operate. Similarly, a second input is directly connected to tap 106 of delay line 11. The third input is connected to tap 107 of delay line 11 through inverter 20, requiring a zero level at that point in the call message to put the three inputs to AND gate 19 at the 1 level. This happens only when A's code 110 is present at the respective taps 105, 106, and 107 of delay line 11.

The presence of the calling ship's code (for example, Ship C's code) at taps 108, 109, and 110 of FIG. 2c is ignored in the transponder mode. The output of AND gate 39 passes through OR gate 37 and sets the one shot circuit 36. One shot 36 will not relax until after a period of time slightly longer than the duration of the expected incoming call, which duration has a standard fixed value in a cooperative system. The output of one shot circuit 36 will therefore hold AND gate 35 conductive for a period just long enough with respect to the calling message which is now fully stored in delay line 11 to pass out through AND gate 33, through amplifier 34, to OR gate 40 and to buffer amplifier 43. The output of buffer amplifier 43 will, in modulator 2, modulate the continuous signal of frequency $f_2$ from oscillator 1 in conformance with the message flowing from delay line 11. The output of modulator 2 will, after amplification to a suitable level in power amplifier 44, pass through duplexer 5 to antenna 4 for transmission back to the calling vessel C. The second input to AND gate 33 from flip flop 130 will in this stand by transponder mode always be a 1. In this way, the conditions of the normal call; namely, that it contain the normal call mode code 100 and the called ship's code (in this case A's code 110) are satisfied, and the complete call including the called ship's code (in this case C's code 011) is sent back as originally received.

If, instead of a normal call, the incoming call is a ring-the-bell call as in FIG. 1b, the operation is the same as above, except that the respective 1 levels at taps 102, 103, and 104 of delay line 11 will now be such that AND gate 14, instead of AND gate 13, will conduct. The output of AND gate 14 will join with the output of AND gate 19 to pass to OR gate 37 and so on for transmission back to the calling ship (in this case Ship C). The output of AND gate 38 additionally causes bell 120 to ring. The conditions of a ring-the-bell call; namely, one containing the ring-the-bell mode code 010, and the called ship's code (in this case Ship A's 110 code) have been met. Bell or other alarm 120 is operated and the message as received is transmitted back to the calling station (Station C).

The structure and operation of the invention in the mode in which Station or Ship A is to answer a CQ call made from Station C will next be discussed; the CQ call of FIG. 1c is employed and additional apparatus is brought into play. In this case, the code of FIG. 1c is received by antenna 4 just as were the previously discussed codes and is applied through receiver elements 6, 7, 8, 9, and 10 to the end of the delay line device 11 seen in FIG. 2c. Operation continues as previously described, with the bits of the CQ call code moving into delay line 11 until the entire message is stored therein with the leading edge of the bracket pulse BR. 1 just arriving at tap 101 of delay line 11 (see FIG. 2a). Since the CQ mode code is 001, the signals at taps 102 and 103 are each zero and a 1 appears at tap 104. This is seen to be the correct code to cause CQ AND gate 15 to conduct, AND gate 15 having also received the bracket pulse pair BR. 1 and BR. 2 through AND gate 12. The output of AND gate 15 is sufficient to trigger the one-shot multivibrator 36 and thus to let the entire message stored in delay line 11 flow out through the enabled AND gate 33, amplifier 34, AND gate 35, lead 215, the OR gate 40, buffer amplifier 43, and so on to be re-radiated by antenna 4. At the same time, flip-flop 42 is triggered by the output of AND gate 15, producing a 1 output that now opens AND gate 41 momentarily to pass the first bracket pulse BR. 1 from AND gate 35 to lead 220. Because of the presence of inverter amplifier 45 and of the fact that the second pulse in the CQ code of FIG. 1c is always zero, the end of the bracket pulse BR. 1 re-sets flip-flop 42 so that only the one pulse is permitted to pass through coincidence gate 41.

The pulse on lead 220 proceeds to the tap 121 of the auxiliary delay line 46 of FIG. 2b. Delay line 46 has taps 121 and 122 which are coupled to the inputs of OR gate 47. When the pulse on lead 220 travels down delay line 46, it first reaches tap 121 and then reaches tap 122 and propagates successively through OR gate 47 as twin pulses entering the primary delay line 11 at tap 105. It will be recognized by those skilled in the art that the output of OR gate 47, in the particular examples of the codes being employed for illustrative purposes, is Ship or Station A's own code and that it is being inserted at the proper time in the bit progression of the message to be transmitted to fill in the 000 or blank region of the code of FIG. 1c with own ship's code; thus, the Reply-to-CQ code of FIG. 1d is generated and retransmitted via antenna 4.

It will be recognized by those skilled in the art that the principles of the invention as taught in the specific example using specific sets of illustrative codes as in FIGS. 1a, 1b, 1c, and 1d respectively to identify the operational mode, the answering ship, and the calling ship may be generally applied to other codes. It will furthermore be clear to those skilled in the art that the apparatus for generating own ship's code may readily be adjusted so that each such ship may have a particular identifying code available in a bound register to the personnel of all ships. It will be understood that the apparatus may readily be extended so that the codes of the called and calling ships may each have more than three bits, if desired. Those skilled in the art will readily understand that alternatives may be substituted for various elements of the invention, and that the invention is not limited in scope to the use of the particular elements illustrated in the drawings. For example, the delay device 11 may be replaced by a conventional shift register device, a well known device for performing the general function of the illustrated tapped delay line 11.

Operation of the invention in answering calls of another station having been explained, consideration will next be given to the structure and operation of the device as an interrogator; let it be assumed that Ship A (Code 101) is to interrogate Ship B (Code 110). The messages that will be employed in these communications appear in FIGS. 3a, 3b, 3c, and 3d.

The mode of operation is selected by positioning the switch blade 53 to one of three contact positions. When Station A is calling Station B, blade 53 is in the position indicated in FIG. 2a and contacts a lead coupled directly to tap 102 of delay line 11. This applies an output to OR gate 30 for supply to AND gate 29. If A desires to ring B's alarm bell 120, switch 53 is moved to couple to delay line tap 103. If A desires to call CQ, switch 53 is moved to contact the lead connected to tap 104 of delay line 11. Evidently, Station or Ship B may operate his equipment for the several modes in a similar manner.

Having selected an operating mode other than the CQ mode, the operator must set in the known called ship's or shore beacon's code. To do this, taps 105, 106, and 107 are arranged in a multiplie switching circuit in which switch contacts are manually controlled according to the known code bits to be used, such as the Ship A's code 110. Each of the switching circuits 52a, 52b, 52c is similar, so that only the representative switching circuit 52a needs to be explained in detail; it is coupled to tap 105 by a triply-branching lead 203, one branch containing a conventional amplifying inverter 22. The switch blade 151 is a dual position switch that is gang coupled to a second dual position switch 152. Switch 151 has a dummy contact and an active contact connected to lead 203. Switch 152 has two active contacts, one coupled directly and the other through inverter 22 to lead 203. With the switches 151, 152 in the position illustrated, the signal on lead 203 is coupled directly to OR gate 24, to AND gate 23, and to lead 205. With switches 151, 152 moved to the alternative contacts, lead 204 ends its circuit at a dummy contact, while an inverted version of the signal on lead 203 goes to lead 205 and to AND gate 23.

Inverters 20 and 21 and switch circuits 52b and 52c operate in a similar manner. With switches 153, 154 in the position shown, switch blade 153 is coupled to a dummy contact and switch blade 154 couples the output of inverter 21 to AND gate 23 and to lead 208. If the switches are moved to the opposite contacts, switch blade 153 couples OR gate 24 to lead 206 and to tap 106; switch blade 154 is then coupled between tap 106 and AND gate 23 and lead 208. In switching circuit 52c, with the blades 156, 155 positioned as shown, tap 107 and lead 207 couple through both blades respectively to inputs of AND gate 23 and OR gate 24. In the opposite position of switch blades 155, 156, switch blade 155 connects OR gate 24 to a dummy contact, while blade 156 is coupled through inverter 20 to tap 107 and to an input of AND gate 23. Lead 203 is permanently connected to an input of AND gate 19 and to lead 209, lead 206 to an input of AND gate 19 and to lead 210, and lead 207 to lead 211.

The output of AND gate 19, as previously noted, is supplied via lead 217 as one input to the AND gates 38, 39 of FIG. 2a. The output of OR gate 24 is sent via lead 218 to one input of a quadruple-input OR gate 30 of FIG. 2a. The OR gate 30 supplies one input to coincidence or AND gate 29 and thus controls OR gate 40 and buffer amplifier 43. The output of AND gate 23 is conducted via lead 219 to one input of quadruple-input AND gate 27 (FIG. 2c).

Figure 3A:
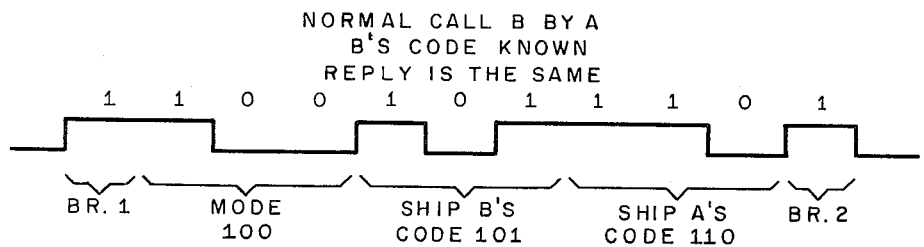
FIGS. 3a, 3b, 3c, and 3d are graphs of codes used in explaining a further mode of operation of the invention.
Figure 3B:
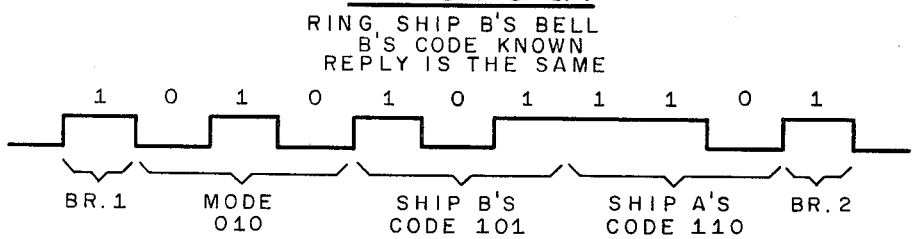
Figure 3C:
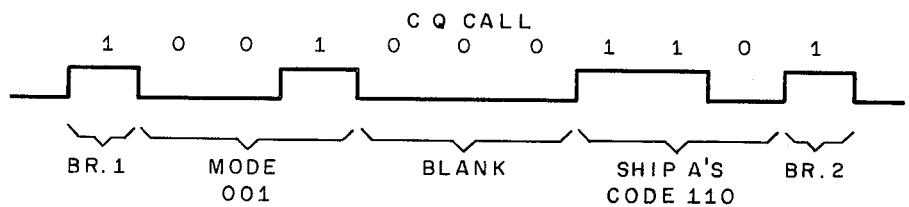
Figure 3D:
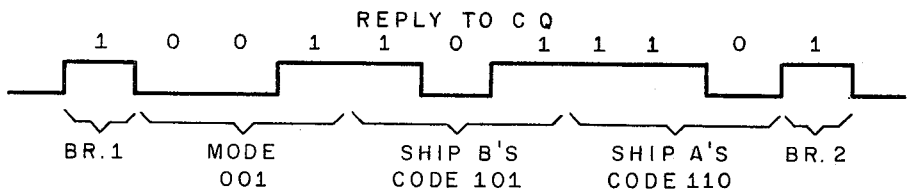

Again, as in FIG. 3a, the code to be transmitted is made up of a first bracket pulse BR. 1, three bits (100) defining the operating mode, Ship B's code 101, Ship A's code 110, and the final bracket pulse BR. 2. The reply is again the same as the interrogating message. If Ship A is to cause Ship B's bell to ring, the mode code is changed, for example, to 010 (FIG. 3b). The reply is again the same. The CQ Call from Ship A to Ship B has a mode code 001, for example, followed by three zeros and Ship A's code 110 with the usual bracket pulses (FIG. 3c). The replay to that CQ Call is seen in FIG. 3c, Ship B's code having automatically replaced the three zeros of the CQ Call of FIG. 3c.

Prior to making the interrogation of FIG. 3a, the ship's navigator or other operator must set in Ship B's code by properly operating the selector switches 151 through 156 of FIG. 2b. These selector switches determine, as before, the character of the bits making up the Ship B code. For example, the Ship B code 101 is generated when the switches are in the positions indicated in FIG. 2a. The mode selector switch 53 of FIG. 2a is also set as illustrated in the figure. The operator is now ready to make the interrogation simply by pressing the key switch 48 of FIG. 2a.

The step voltage resulting from pressing the switch 48 is differentiated by the differentiation network 49. The resulting pulse sets flip-flop 50. The output 1 from flip-flop 50 is supplied via lead 221 to shift the frequency of oscillator 1 to the interrogation frequency $f_1$. The output 1 from flip-flop 50 also opens AND gate 54 to the first trigger or synchronizing pulse from a conventional trigger or synchronizing pulse generator 51. The trigger pulse has exactly the length of one of the bits of the coded message. The trigger pulse passing through the now enabled AND gate 54 sets flip-flop 130. The 1 output from flip-flop 130 opens AND gate 56 to permit the trigger pulse to enter delay line 11 at tap 100. The 1 output of flip-flop 130 also travels along lead 213 and opens AND gate 29. The zero from flip-flop 130 closes AND gate 33. The pulse at tap 100 can therefore propagate down delay line 11 only from left to right.

As the pulse received on tap 100 passes tap 101, it will provide an output through OR gate 32 to OR gate 30, forming the first bracket pulse BR. 1. As it passes tap 102, it will provide an output through mode select switch 53 to OR gate 30. As the other two connections to the mode select switch 53 are open, there is no output to OR gate 30 from taps 103 or 104. This operation forms the desired normal Call B mode code 100. Only one output exits at a time and gates 12, 13, 14, and 15 are not opened.

In FIG. 2b, as the pulse passes taps 105, 106, and 107 of delay line 11, it will output through the left contacts of the select code switches 151, 155 to OR gate 24 and thus via lead 218 to OR gate 30. Note that the switches connected to tap 106 are open and the Call B code 101 is therefore formed, as only one tap output exits at a time and AND gates 19 and 23 are therefore not opened. As the pulse traveling in delay line 11 passes taps 108 and 109 of FIG. 2c, it provides outputs to OR gate 25 to form own ship or Ship A's code. As tap 110 is not connected to OR gate 25, the code 110 is formed. As only one output exits at a time, AND gate 26 is not opened. The OR gate 25 supplies an output through lead 223 to OR gate 30.

As the pulse continues to travel in delay line 11 in FIG. 2c, it will reach delay line tap 112 and will pass in lead 201 back to OR gate 32 in FIG. 2a, there to generate the second pulse BR. 2 of the bracket pulse pair. The OR gate 32 also supplies an output to OR gate 30. As OR gate 30 receives, in order, the outputs of all directly connected taps of delay line 11, the complete Call B by A message 11001011101 passes through it. The complete message then passes through AND gate 29, which is being held open by the 1 from flip-flop 130, and will pass through OR gate 40 to be radiated on carrier frequency $f_1$ by antenna 4. Finally, after having propagated through the last section 11k of the delay line 11 to tap 113, the pulse at tap 113 will reset flip-flop 130 by traveling along lead 212 and through AND gate 55, switching the device back to the receiving mode until the next trigger from synchronizer generator 51 arrives. As a result, the system if in the transmitter mode just long enough to radiate the total message of FIG. 3a.

As the forming pulse from trigger generator 51 is passed to tap 112, it is also passed to the AND gate 57, which has opened by the 1 from flip-flop 130 via lead 213. After passing through AND gate 57, the pulse is differentiated by differentiator 58. The differentiated signal is used to set flip-flop 59, which event opens AND gate 61. Setting flip-flop 59 and opening AND gate 61 permits pulses from pulse generator 60, which acts as a range clock, to be counted by range counter 62 (FIG. 2b).

In due time, the message of FIG. 3a will be returned from the transponder at Station B exactly as sent out from Station A with the exception that it will be transmitted and received on carrier frequency $f_2$. It will be received at Station A, as before, and will enter delay line 11 at tap 114 of FIG. 2c. Nothing will happen until the entire message of FIG. 3a is stored in delay line 11.

As in the previous instance of an in-coming signal, the leading edge of the bracket pulse BR. 1 ultimately reaches tap 101 of delay line 11 while, simultaneously, the leading edge of pulse BR. 2 reaches tap 111 of delay 11, the two bracket pulses causing an output pulse to pass through AND gate 12 of FIG. 2a. At the same time, the mode code bits are of correct level to combine with the output of AND gate 12 and to pass through AND gate 13 and then to pass to AND gate 27 via OR gate 31 and lead 222.

It is to be noted that the quadruple input AND gate 27 has inputs from AND gate 26, AND gate 23 via lead 219, OR gate 31 via lead 222, and flip-flop 50 via lead 221. Its output is connected to counter 73 via leads 225, 224, but is also supplied to AND gate 66, yet to be described. Further, the output of AND gate 27 is supplied as one input to each of AND gates 66d, 66e, and 66f.

The companion AND gate 28 of FIG. 2c has three possible inputs, one from AND gate 15 of FIG. 2a, one from flip-flop 50, and one from AND gate 26 as in FIG. 2c. The output of AND gate 28 is supplied as one input to each of the triple-input AND gates 66a, 66b, 66c.

At the same time that bracket pulses BR. 1 and BR. 2 pass through the bracket AND gate 12 of FIG. 2a, the bit levels will be correct at taps 105, 106, and 107 of delay line 11 in FIG. 2b to pass through the correctly positioned switches 151 through 156 (set to Station B's code) and to cause AND gate 23 to pass an output pulse on lead 219 to AND gate 27. Because AND gate 19 has been set to accommodate only Ship A's code, it can not respond to Station B's code. At the same time that bracket pulses BR. 1 and BR. 2 pass through the bracket AND gate 12 of FIG. 2a, the bit levels will be correct to pass an output pulse through AND gate 26 to one input of AND gate 27, an amplifying inverter 65 being located in the connection between delay line tap 110 and AND gate 26, thus recognizing Ship A's code.

It will be seen that the conditions are correct for the recognition by the system of the coded message replying to the interrogation; these conditions are met by the simultaneous presence of the bracket signals BR. 1 and BR. 2 at the input of AND gate 12, the normal Call B pulse output of AND gate 13, the recognize Code B pulse from AND gate 23, and the recognize Code A pulse from AND gate 26. Any pulses from OR gate 32, mode switches 151 through 156, OR gate 23, or OR gate 25 as collected at the inputs of OR gate 30 are blocked by the open AND gate 29.

The outputs from AND gate 27 will open coincidence or AND gates 66d, 66e, 66f for application of control signals to a conventional display 68. The several sections of display 68 are individually driven by the outputs of OR gates 67a, 67b, 67c. The OR gate 67a is controlled by the outputs of AND gates 66a and 66d, OR gates 67b is controlled by AND gates 66b and 66e, and OR gate 67c is controlled by AND gates 66c and 66f. The output of AND gate 27 opens AND gates 66d, 66e, 66f, which gates pass the signals at the taps 105, 106, and 107 of delay line 11 as selected by switches 151 through 156 through the OR gate 67 to the display 68; thus, Station B's code is read out and the observer is assured that Station B has been successfully interrogated and has answered.

In the above operation, the output of AND gate 27 also opens the previously mentioned AND gate 66 of FIG. 2c. This event occurs in coincidence with the output of the first bracket pulse BR. 1 from the delay device 70; device 70 has an inherent time delay substantially equal to the time duration of the coded message. Thus, only the first bracket pulse BR. 1 passes through AND gate 66, this pulse being further delayed by the delay trim device 71. The delay of device 71 is substantially equal to the total time of transit of the message through the beacon system circuits, plus any trim adjustment needed to adjust the interrogator to a standard delay period.

After passing through trim delay 71, the pulse from AND gate 66 is processed by differentiator 72 and is applied to the re-set terminal of flip-flop 59. Such an event causes AND gate 61 to be closed, stopping the flow of pulses from range pulse generator 60 to range counter 62 (FIG. 2b), stopping its count. The range count to Ship or Station B, which may be a shore based beacon, is then stopped and remains stored in the counter 62. At the same time as the output of AND gate 66 is generated, the output of AND gate 27 adds a count to the count stored in counter 73 of FIG. 2b.

The system will then stand by in the interrogator mode until the next trigger arrives from synchronizing trigger generator 51. It will ignore any other interrogations received while in this mode.

Range counter 62 has plural counting stages with output taps employed in the conventional manner to yield inputs to each of the several AND gates 63. Another input to each AND gate 63 is taken from the output of counter 73, which signal is also supplied as an input to the re-set terminal of flip-flop 50. The outputs of AND gates 63 are coupled to the several inputs of a conventional count display 64.

When a next succeeding trigger pulse is generated by trigger generator 51, the process is automatically repeated, the only difference being that the sum of two range counts is now stored in the range counter 62 and the count in counter 73 is now 2. This process continues until the count in counter 73 reaches a predetermined value (here assumed to be 256 for purposes of illustration). When the predetermined count is reached, an output from counter 73 re-sets flip-flop 50 of FIG. 2a, returning the system to its transponder mode by opening AND gates 54 and 55, which prevents trigger pulses from trigger generator 51 from setting flip-flop 130. The output from counter 73 is also used to open the four AND gates 63 associated with counter 62. This latter event transfers the count stored in range counter 62 to display 64. It is convenient to tap the stages of counter 62 in such a conventional manner that the read-out is the desired average of a plurality of measurements. For example, if the predetermined count used in counter 73 is 256, the output taps from the range counter 62 are taken in a conventional manner beginning at the eighth stage down in the counter 62. Transfer in this manner will be recognized by those skilled in the art as being equivalent to dividing the counted stored in counter 62 by the predetermined number 256 so that the number display in display 64 is the average of 256 individual measurements.

The invention as thus far described has significant versatility and can be advantageously employed in many different ways. For example, it may as described be used on small vessels or others not generally equipped with a radar navigation system. In the case of such a small vessel, the system will provide enhancement of own ship's return to an interrogating radar system and will also permit own ship's identification by the CQ call from the interrogating station. The interrogating station can also ring own ship's radio-phone bell. By replying on a carrier frequency different from the interrogating frequency, all sea, weather, and land clutter is eliminated, a feature of significant value characterizing the novel system. The small boat operator can also use the invention to measure two or more ranges to two or more shore navigation transponders, the operator than plotting the measured ranges on a conventional navigation chart to get a fix. The simplest small boat operation would use a system with the mode selection switch 53 removed, leaving that Call A or B code which would be unique to that small boat permanently wired into the system.

On a large radar-equipped vessel, the following connections and modifications are made to operate the invention with an otherwise conventional radar system aboard that ship. As in FIG. 4, a microwave switch 75 is added to connect the invention into the radar system in a cooperative manner. Microwave switch 75 is adapted to be controlled by signals derived at terminal 128 from flip-flop 50 which is ultimately controlled by switch 48 of FIG. 2a. Switch 75 has four ports, one connected to an omnidirectional antenna 4a like antenna 4 of FIG. 2a, one connected to the azimuth scanning radar antenna 76, a port connected to the transponder duplexer 5a, and a port for connection to the conventional pulse radar transceiver. Normally, microwave switch 75 is set to connect duplexer 5a and thus the power amplifier 44 and mixer 3 of FIG. 2a to the beacon antenna 4a. When switches 48 and 79 are closed, the output of flip-flop 50 is used to connect radar antenna 76 through switch 75 for cooperative operation of the radar and beacon systems.

Figure 5:
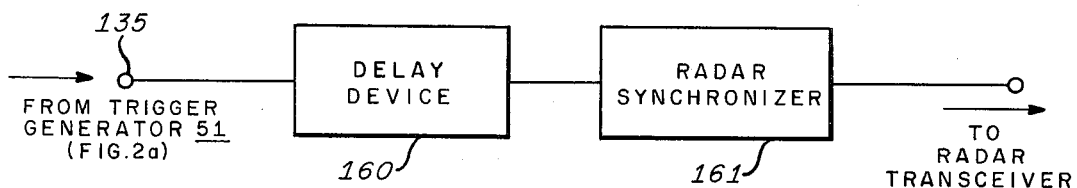

In use of the novel transducer with a radar system, a delayed output of synchronizer trigger generator 51 must be used to trigger the radar system. This is done continuously as by delay device 160 in FIG. 5 so that, whenever an interrogation is made, the decoded transponder pulse from AND gates 27 or 29 will fall on or just beyond the useful part of the radar display without affecting the radar picture. In this way, the beacon transmission also advantageously takes place in the radar dead time at the end of each radar range sweep. In FIG. 5, the input to delay device 160 from trigger generator 51 and terminal 135 is used directly within the conventional radar synchronizer 161 as the radar system synchronizing signal for control of the radar transceiver system.

Figure 6:
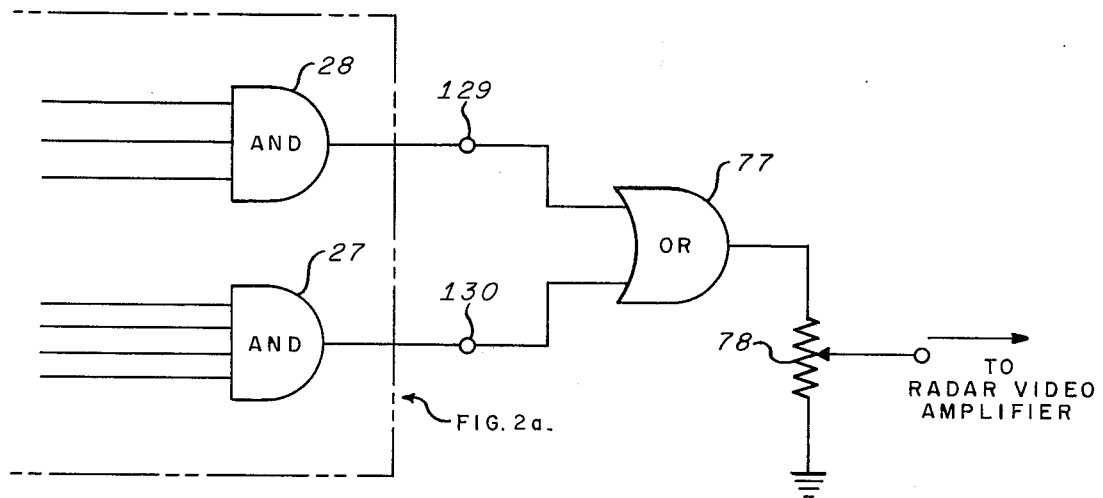

For cooperative use of the invention with a radar transceiver, the output of AND gates 27 and 28 of FIG. 2c must be fed through the OR gate 77 of FIG. 6 to a gain control potentiometer 78. Potentiometer 78 is used separately to control the beacon intensity on the radar plan position indicator. Its output must therefore be connected into the radar video after the usual radar video gain control state. This permits independent reduction of the radar painting intensity to remove the effect of clutter without reducing the beacon reply intensity.

For the same type of operation, as illustrated in FIG. 2c, a one-shot 74 is added that is triggered by the conventional variable range marker control pulse from the navigator controlled radar variable range marker 142. One-shot 74 will relax after a period somewhat longer than the length of the coded message. One-shot 4 is particularly used in the CQ mode to gate the called ship's code into a display read out. The range mark is set over the desired target by the navigator. The navigator performs azimuth gating merely by pushing the interrogate key 48 just before the radar plan position indicator scan line passes over the selected target. The count-to-256 counter 73 of FIG. 2b must be changed to a counter-to-16 counter and the dividing ratio changed to match. This is based on the assumption that the interrogator will get at least sixteen acceptable replies. It would have to be matched to the radar hits per radar azimuth scan in any event.

In operation with a radar system, all three interrogation modes are retained, and except for the modifications noted above, the apparatus is used exactly as described previously. With switch 79 open, the interrogator is used in the normal manner to interrogate fixed shore beacons for navigation. It will usually be desirable to retain a large number such as 256 associated with counter 73 for interrogations in this mode so as to provide maximum accuracy of range measurement. With switch 79 closed or conducting, the interrogation is transmitted through the radar antenna 76 to interrogate other ships. With switch 79 open and the pushbutton 48 of FIG. 2a not pushed, the system remains as before in the stand by condition as a transponder connected to the beacon antenna 4a.

Figure 7:
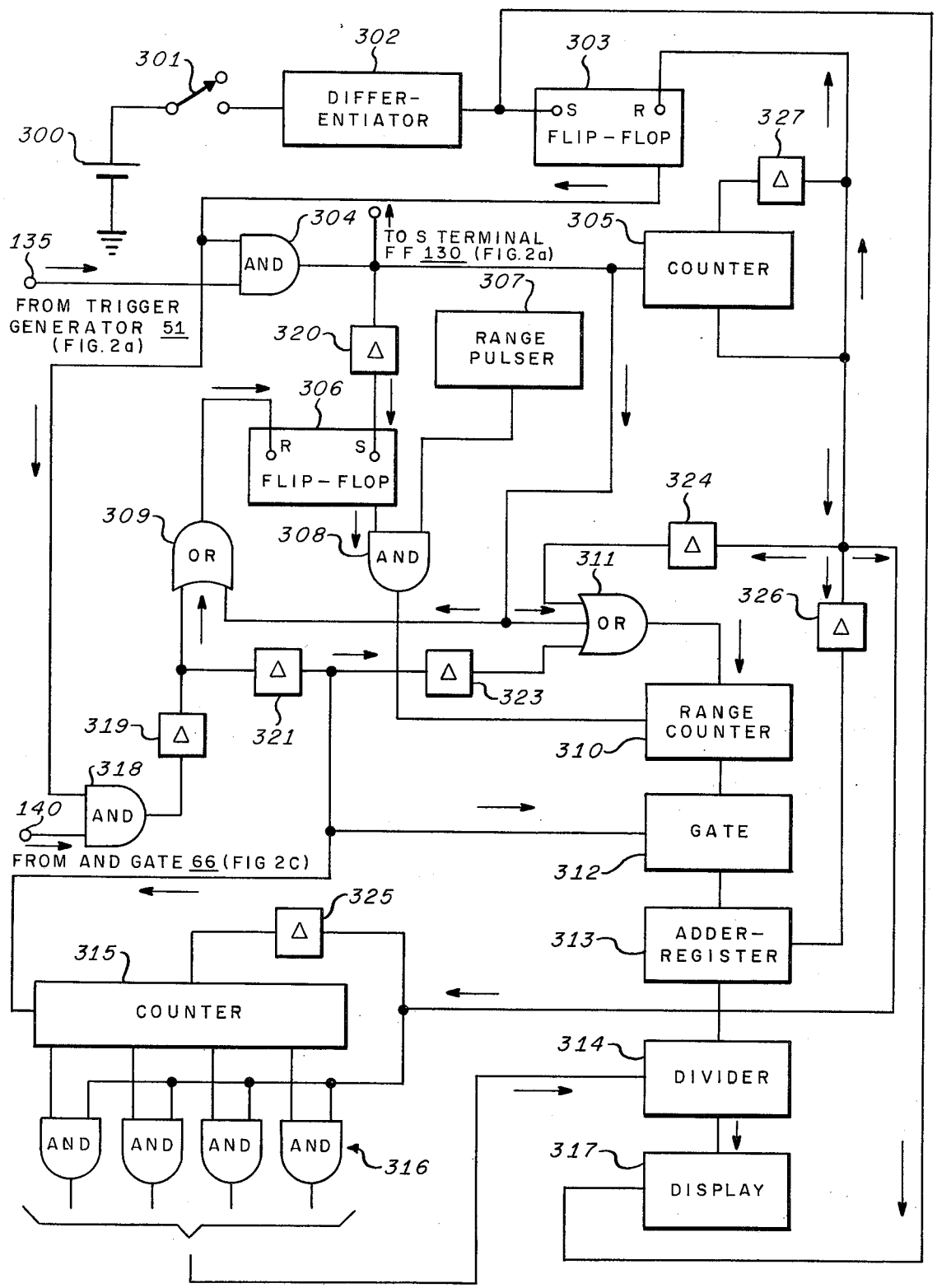
FIG. 7 is a wiring diagram showing electrical connections of an alternative circuit for use when the novel beacon system is used cooperatively with a radar system.

FIG. 7 illustrates an alternative arrangement of apparatus which may be used in the transducer system in cooperation with a radar system, especially when range measurements are to be made by interrogation through the radar antenna 76. It will readily be seen that interrogations through the azimuth scanning radar antenna 76 produce fewer responses than do interrogations through the omnidirectional antennas 4 or 4a. Accordingly, the system of FIG. 7 is designed to compensate for the fact of the fewer responses and further for the fact that the actual numbers of responses per radar antenna scansion will often be variable as well as few.

The arrangement of FIG. 7 fits into the system of FIGS. 2a, 2b, 2c, replacing or operating in addition to certain elements in those figures associated especially with counters 62 and 73 of FIG. 2b. For example, the system of FIG. 7 derives synchronizing trigger pulses from terminal 135 and thus from trigger pulse generator 51 of FIG. 2a. It derives signals from terminal 140 and thus from AND gate 66 in FIG. 2c. Furthermore, it comprises certain elements which have roles analogous to those of certain elements of the previous figures. For example, key or switch 301, differentiator 302, and flip-flop 303 are respectively analogous to elements 48, 49, and 50 of FIG. 2a. Range pulse generator 307 is analogous to range pulse generator 60 of FIG. 2c, and flip-flop 306 and AND gate 308 are analogous to elements 59, 61 of FIG. 2c. Range counter 310 and display 317 are analogous to elements 62 and 64 of FIG. 2b.

To make range measurements when the interrogator is operating through radar antenna 76, the operator desiring to interrogate a target whose code is known first sets that code into the apparatus by proper manipulation of switches 151 through 156 of FIG. 2b. Then, when the radar scan direction seen on the radar plan position indicator reaches the target image, he causes key 301 to connect. As before, the unidirectional surge is differentiated in differentiator 302, and the resultant pulse sets the flip-flop 303. In this way, flip-flop 303 controls the duration of the interrogation period independently of the length of time that the operator holds down key switch 301. As remains to be explained, the duration of interrogation is determined by counting a predetermined number of trigger pulses in counter 305. Upon reaching the predetermined count, flip-flop 303 is reset, stopping the interrogation process.

Figure 4:
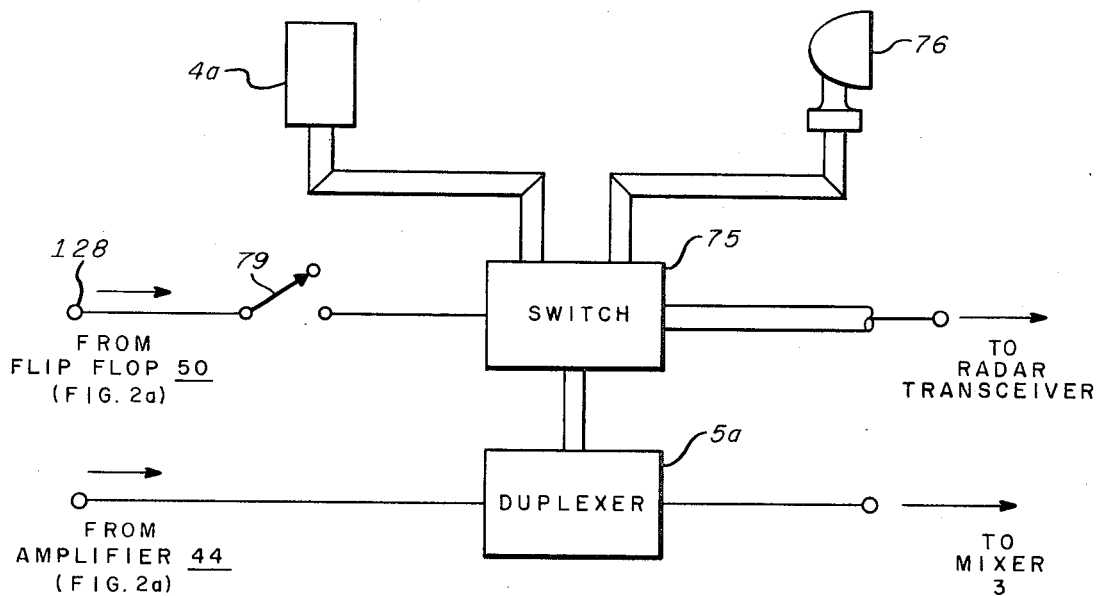
FIGS. 4, 5, and 6 illustrate changes made in a conventional radar system when cooperative operation with the novel beacon system is desired.

The 1 output from flip-flop 303 causes coincidence or AND gates 304 and 318 to conduct; as noted above, AND gates 304 and 318 are respectively coupled to terminals 135 and 140 in FIGS. 2a and 2c. The next synchronizing trigger pulse from the continuously operating trigger generator 51 triggers the radar system as in FIG. 5 and causes the transmission of the normal interrogator coded message via antenna 76 (FIG. 4). In FIG. 7, it also places a 1 in counter 305, resets flip-flop 306 via OR gate 309, and passes a pulse through OR gate 311 to clear the conventional counter 310. The same trigger pulse from generator 51 also flows through a short delay device 320, immediately setting flip-flop 306 again. The 1 output from flip-flop 306 opens AND gate 308, permitting pulses from the range pulser 307 to be counted by range counter 310.

The navigator will close switch 301, thus setting flip-flop 303 prior to the time that the radar beam sweeps past the target and the above described process will repeat as long as flip-flop 303 is set, with each trigger from pulse generator 51 incrementing counter 305 by one. As there is no correctly coded target yet in the radar beam, there will be no other result. When the radar beam sweeps past the target, however, the first successful decoding event may be obtained in the apparatus of FIGS. 2a, 2b, 2c. In this event, AND gate 66 (FIG. 2c) will indicate a successful decoding by supplying a signal at terminal 140 of FIG. 7. As the pulse will arrive at terminal 140 before the next trigger pulse arrives at terminal 135, it resets flip-flop 306 via short delay 319 and OR gate 309, stopping the count of range counter 310. The short delay device 320 interposed between AND gate 304 and flip-flop 306 matches the short delay of OR gate 309 through which the pulse passes in traveling from AND gate 318 to flip-flop 306 so that of trimming delay device 319. The pulse on terminal 140 will also pass through short delay 321, causing the transfer through the conventional transfer gate 312 of the last total count in range counter 310 to adder-register 313, wherein the sum of all successful range counts accumulates. The several delay elements 319 through 323 are inserted to provide equal delays in the effective channels between terminal 135 and flip-flop 306 and terminal 140 and flip-flop 306. Through the short delay 323 and OR gate 311, the successful decode pulse from terminal 140 also clears range counter 310 after its count has been transferred to adder-register 313. Each successful decode pulse also adds a one to the store in counter 315. This process repeats each time there is an output from AND gate 66 of FIG. 2c indicating the successful decoding of an incoming message, the range count being made in range counter 310 and being added to the store in adder-register 313 where the sum of all successful range counts is accumulated, and one being added to the store in counter 315 for each successful decoding event. Counter 305 is incremented by one by each initiating trigger pulse from the synchronizer trigger generator 51 independently of whether or not there is a successful decode of a reply to an interrogation.

The process cyclically repeats for each successful decoding event. However, if any transmission fails to elicit a reply, range counter 310 is cleared because an output is produced by OR gate 311 when the next synchronizing trigger pulse appears at terminal 135. There will be no signal for causing the transfer gate 312 to cause a transfer to the adder-register 313; the count in element 313 therefore remains undisturbed. Counter 305 will, however, be incremented even in the absence of a successful decode.

During the above processing, the scanning radar antenna 76 is gradually sweeping past the target being interrogated. When the radiation pattern of the antenna has substantially passed the target, the process discontinues, but counter 305 continues to be incremented by one for each trigger pulse appearing at terminal 135. Eventually, the count in counter 305 will reach a predetermined value. A typical value will be, for example, 2,000 for a radar system operating with a transmitter pulse repetition rate of 1,000 pulses per second. This would make the period between interrogations two seconds. At the predetermined count value, a 1 output produced by counter 305 travels through small delay 326 and causes adder-register 313 to dump the sum of all successful range counts stored therein into divider 314, clearing register 313 in the process. The same 1 output of counter 305 causes the successful event counter 315 to pass its store through plural AND gates 316 to divider 314. Divider 314 performs in a conventional manner the function of dividing the sum of all successful range counts by the sum of successful decodes and the result is displayed by the conventional indicator 317. The display of indicator 317, like that of indicator 64 of FIG. 2b, is the average of a plurality of successful range counts and is statistically a value of improved accuracy over the value that would be achieved by making only one range count.

The system is automatically reset to repeat the above operation. For example, the 1 output of counter 305 is fed back to reset the flip-flop 303, stopping further interrogations. The counter 305 also supplies the output 1 through the short trimming delay device 327 to clear itself, through the short delay 324 and OR gate 311 to clear counter 310, and through the short delay 325 to clear counter 315. Thus, the system of FIG. 7 is returned to its original state, ready for the next time the operator wishes to make an interrogation, all registers and counters being cleared. The read out display 317 will conveniently continue to display the last average range value. This is removed the next time the operator closes key switch 301 to make a new interrogation, because the pulse from differentiator 302 is then coupled as a clearing pulse to an input of display 317, readying it for a new count.

In operating with a radar system as discussed in the foregoing, it is assumed that a transponder will be triggered and will therefore reply only during illumination by the main beam of the radar antenna. However, radar antennas also produce small but finite side lobes. Should such side lobes causes spurious responses, the operator may adjust the power level generated by power amplifier 44 of FIG. 2a by using gain adjustment 44a.

The transponder system of FIGS. 2a, 2b, 2c is considerably more complex than is required for use in the novel system as a shore or otherwise fixed base transponder beacon in that it has several functions not called for in fixed marker applications. Accordingly, the simplified system of FIG. 9 may readily be used for such applications. The system of FIG. 9 is designed to receive, to recognize, and to transmit the coded message shown in FIG. 8. It is seen that the message of FIG. 8 consists again of first and last bracket code bits BR. 1 and BR. 2. The bracket pulse BR. 1 is followed by the transmission of the triplet bits 100 representing the normal call mode which must be used for calling a shore beacon. Then, there follows the desired shore beacon's particular identifying code, which may be 010, for example. Before arrival of the pulse BR. 2, there appears the calling Ship A's code (110, for example). The same message is transponded by the shore beacon.

The system of FIG. 9 may include substantially the same transmitter and receiver elements as those of the more complete system of FIGS. 2a and 2c. Such elements include transmitter modulator 2, receiver mixer 3, omnidirectional antenna 4, duplexer 5, i.f. amplifier 6, detector 7, threshold circuit 8, limiter 9, and power amplifier 44. Master oscillator 1a is similar to master oscillator 1 of FIG. 2a, but is now required to provide only the carrier frequency $f_2$, since the shore based system does not interrogate but simply replies. Delay device 401 of FIG. 9 is generally similar in function to delay device 11 of FIGS. 2a, 2b, and 2c.

Figure 8:
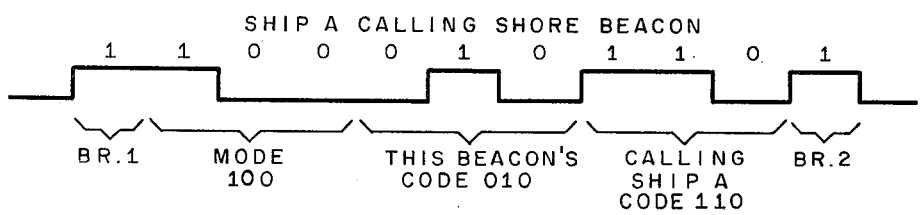
FIG. 8 is a graph of a code for operation of the invention in a further mode.
Figure 9:
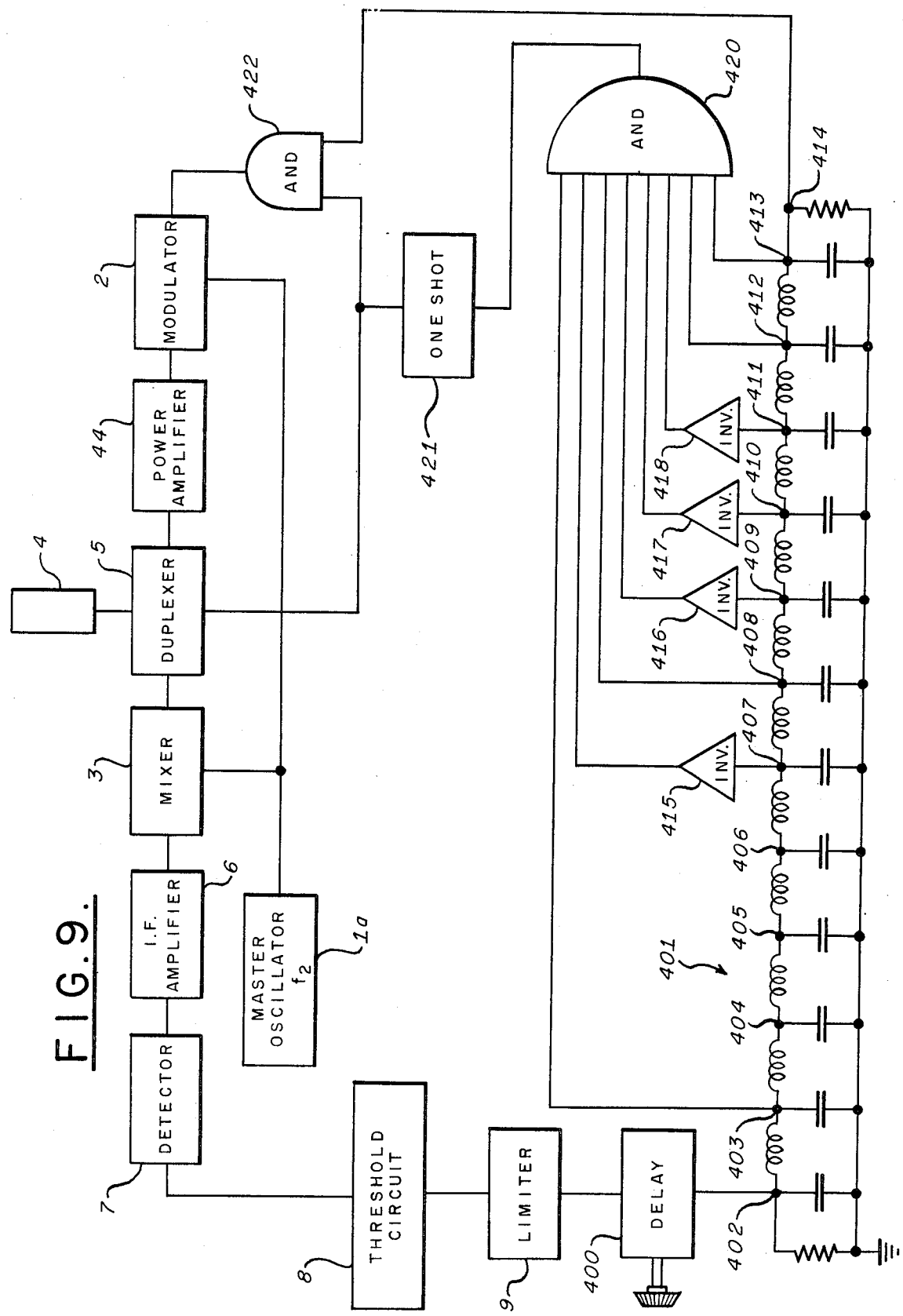
FIG. 9 illustrates a version of the beacon system designed for shore based operation.

When the message of FIG. 8 is received by antenna 4 of FIG. 9, it is supplied through duplexer 5 to mixer 3. As the transponder frequency $f_2$ differs from the interrogating frequency $f_1$ by the intermediate frequency, the arriving carrier is translated to the intermediate frequency within mixer 3, being beaten therein with the carrier $f_2$ produced by master oscillator 1a. After amplification by i.f. amplifier 6, it is detected by detector 7. As before, if the detected signal is of sufficient amplitude to exceed the arbitrary threshold level of threshold circuit 8, it is limited by limiter 9 and passes through adjustable trimming delay device 400 to the decoding delay device 401, entering the delay device of the latter at tap 402.

As the code to be recognized passes through the regular multi-section terminated delay device 401, nothing happens until the leading edge of bracket pulse BR. 1 reaches tap 413, at which time all of the message bits are stored in delay device 401. The BR. 2 bit is found at tap 403, the three bits of the calling party's code are distributed at terminals 404, 405, and 406, the beacon's code at taps 407, 408, and 409, the mode code at terminals 410, 411, and 412, and the BR. 1 bit at tap 413.

The conventional AND or coincidence gate 420 is supplied with a plurality of inputs. One is applied directly from tap 403 of delay device 401, one from tap 407 through inverter 415, one directly from tap 408, one from tap 409 through inverter 416, one from tap 410 through inverter 417, one from tap 411 through inverter 418, one directly from tap 412, and one directly from tap 413. If the incoming message has the correct code, namely, the arbitrary normal calling code 100 and the called beacon's code (arbitrarily 010 in this example), all of bit levels of the message and only that message, including the bracket pulses, are simultaneously correct at AND gate 420 to cause it to yield an output pulse. As in the system of FIGS. 2a, 2b, and 2c, the inverters 415, 416, 417, 418 check for zeros in the received message code. At the instant of time when line 401 is filled, the calling party's code is also stored in delay line 401 but, as nothing is to be done with this information at the shore beacon, no attempt is made to decode it.

When the decoding produces an output pulse at the output of AND gate 420, one-shot multivibrator 421 is set and the 1 output from one shot 421 opens AND gate 422. This event permits the entire message stored by delay line 401 to pass through AND gate 422 into transmitter modulator 2 for retransmission, as before, over the beacon antenna 4. The period of one-shot circuit 421 is slightly longer than the total length of the message; as long as the period is longer, its actual time length is not critical. The output of one-shot 421 is also available to switch the duplexer 5 to the transmission mode, if the duplexer is one of the types of conventional duplexers that require such switching.

Since the shore based beacon operates in the transponder mode only, oscillator 1a always produces carrier frequency $f_2$, the standard transponder reply frequency. The carrier is code modulated by the coded message, as before, within transmitter modulator 2 and, after amplification by power amplifier 44, is passed through duplexer 5 to be re-radiated by antenna 4. Thus, the simplified system of FIG. 9 meets all of the requirements for making it fully compatible with the system of FIGS. 2a, 2b, and 2c by answering only a message beginning with the normal calling code and this beacon's identity code and by re-radiating the message exactly as received, including the calling party's code and the two bracket pulses.

Accordingly, it is seen that the novel navigation system overcomes the several disadvantages of the prior art and presents the complete degree of versatility necessary for compatible and cooperative operation in several modes and applications. Of major significance is its ability to enhance target detection. For instance, consider operation as discussed above of the invention in a small vessel not equipped with radar. Here, the apparatus is fitted with an omnidirectional antenna and generally is in the stand by or transponder mode. Any shore or ship radar station equipped with the invention integrated with its radar will use its equipment in its interrogation mode to interrogate the smaller ship's device in its transponder mode. The reply may be displayed on the interrogative vessel's radar display.

As the signal returned from the small vessel is a function of the transponder transmitter power and antenna gain and not markedly of the vessel's radar echoing area, and as all vessels have the same beacon antennas and transmitters, all returns are substantially the same, regardless of vessel size. Furthermore, as the signals are received by a means other than the radar, the radar gain may be diminished so that land masses and weather or sea clutter form a lens bright picture. As the transponder replies may continue to be displayed at full brilliance, returns from both large and small vessels are similar and stand out clearly against clutter background. One objective of the invention, enhanced target detection, is therefore readily met.

A further objective, that of vessel identification, is also successfully met. The interrogator sends out a burst of coded pulses in which the presence or absence of the different pulses in the burst conveys intelligence and therefore forms the message. If the interrogator is located on a cooperating radar-equipped ship, there may be a display at a point on the radar indicator signaling the presence of an unknown target. In this example, the interrogator will always send out a message that starts with a framing or bracket bit pulse, followed by a short code group signifying that a general or CQ call is being made, then by a blank space, then by the calling vessel's code, and ending with the always present final bracket pulse. When the interrogative signal is radiated through the radar antenna and its energy therefrom is confined to a narrow beam in space, transponders in range of the radar will reply only as the radar beam sweeps past their antennas.

As the emission of the interrogation message is timed with the emission of the radar transmitter pulse so that both returns must arrive substantially together, they are displayed together in time and position on the radar plan position indicator. When each transponder replies, it fills the blank space in the CQ message with its own code. The radar range-azimuth gate, which can by normal radar procedures be located over the unknown target's display on the radar plan position indicator, is also employed to gate part of the message returned by the unknown vessel into a display which presents the unknown ship's identifying code. Thus, the objective of unknown vessel identification is readily met.

One of the severe difficulties of the prior art beacon and radar-beacon displays is the mutual interference factor previously mentioned. This interference is eliminated, according to the invention, in part because each transmission from own interrogator contains own ship's code and because the called transponder returns the message as received except for filling in the blanks with its own code. As own ship's receiver is designed to accept only messages containing own ship's code, all of the unwanted replies from other ship's interrogations are rejected and there is no mutual interference.

All shipboard transponders reply to each interrogation; thus, the problem of transponder saturation is inherent. However, the interrogator message contains a blank (000) which is normally replaced by the called party's code. Once the called party's code is available, it is placed within the interrogation code and the code bits of the first part of the message are corrected to end the CQ action. Now, only the called transponder replies, saturation is reduced, and garbling or confusion caused by overlapping code replies is substantially reduced.

In the navigation mode permitted by the novel system, the interrogation function is important to both large radar-equipped ships and small craft carrying only the beacon of this invention. In the navigation mode, the navigator having determined the position and address of a shore navigation beacon from his Light List or other publication, sets in the code of the desired shore beacon and interrogates that beacon. With his initiation of an interrogation, he also allows pulses from the stable ranging oscillator whose frequency is accurately known to be gated into a pulse counter. These pulses continue to be counted until the gate is closed by the decoded reply message from the shore beacon of interest. Because of the constant velocity of propagation of radio waves, the count left in the counter is an accurate measure of range to the beacon.

If the stable ranging oscillator interpulse period corresponds, say, to 10 feet (which requires an oscillator frequency on the order of 50 mHz), range is measured precisely to the nearest ten feet. Additional accuracy is obtained according to the invention by averaging many automatically repeated range measurements over a relatively short period of time; as many as a thousand measurements made in a second's time may be averaged for improved precision. By measuring range to another known point, the small craft operator has two ranges which he can then chart in a conventional manner to fix his position to the desired accuracy. In this way, the navigator can get dual or even triple lines of position before his vessel has time to move an appreciable distance.

In the case of the radar-equipped vessel, the omnidirectional antenna of the combination device is retained and is normally connected to the combination device as it stands by in the transponder mode so that it can be interrogated by all who wish information about the vessel. For speed of operation, the navigator can continue to use the omnidirectional antenna to perform the navigation function exactly as is done by the small boat operator. If the navigator wants to enhance radar targets or to identify particular points on the radar display, he will switch to use of his radar antenna, as described above.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Navigational radio repeater means responsive to a carrier pulse train, wherein the predetermined presence or absence of successive pulses in said carrier pulse train conveys a total message of predetermined length, said total message being composed of successive sub-messages, comprising:

receiver means responsive to said carrier pulse train, transmitter means,
means responsive to said receiver means for serially instantaneously storing said successive sub-messages in respective storage sections of said instantaneous storage means,
plural decoder means respectively responsive to said respective storage sections for generating respective recognition signals in the presence of respective desired sub-messages, and
signal processing means responsive to at least two portions of said plural decoder means for permitting said total message to flow from said instantaneous storage means in the presence of said respective desired sub-messages for retransmission by said transmitter means.

2. Apparatus as described in claim 1 including decoder means responsive to at least one of said storage sections for selective recognition of a desired one of said sub-messages.

3. Apparatus as described in claim 2 including display means responsive to said decoder means for displaying at least one of said sub-messages.

4. Apparatus as described in claim 2 wherein at least one portion of said plural decoder means includes inverter means.

5. Apparatus as described in claim 1 wherein said signal processing means includes first coincidence means responsive to said plural decoder means and to the instantaneous presence of said total message within said respective storage sections.

6. Apparatus as described in claim 5 wherein said signal processing means additionally includes second coincidence means responsive to first and second portions of said plural decoder means.

7. Apparatus as described in claim 6 further including first delay means responsive to said second coincidence means adapted to be conductive for a period of time substantially equal to the duration of said total message for passage of said total message.

8. Apparatus as described in claim 6 wherein:
a first of said storage sections comprises first tapped delay means, and
said signal processing means includes third coincidence means responsive to a desired sub-message instantaneously stored at said taps in said first storage section,
said third coincidence means being additionally responsive to the instantaneous presence of said total message within said instantaneous storage means for producing an output from said third coincidence means,
said first coincidence means being responsive to said third coincidence means.

9. Apparatus as described in claim 8 wherein:
a second of said storage sections comprises second tapped delay means serially connected with said first tapped delay means, and
said signal processing means responsive to said second storage section includes selective switching means for selectively coupling sub-message signals instantaneously stored at said taps in said second storage section through fourth coincidence means to said second coincidence means.

10. Apparatus as described in claim 9 further including means for substituting an alternative sub-message for the sub-message instantaneously stored at said taps in said second storage section comprising:
fifth coincidence means responsive to a predetermined desired sub-message stored instantaneously in said first storage section for generating a control signal, and
second delay means responsive to said control signal for generating said alternative sub-message for coupling (within) between said first and second storage (section) sections.

11. Apparatus as described in claim 9 including master oscillator means selectively operable for supplying carrier frequency signals to said receiver means or to said transmitter means.

12. Apparatus as described in claim 11 wherein said receiver means additionally includes in series relation:

receiver detector means, and
pulse amplitude threshold means.

13. Apparatus as described in claim 1 wherein:
said transmitter means includes transmitter circuit means for generation of a second carrier frequency, and
said receiver means includes receiver circuit means having a predetermined intermediate pass band,
said second carrier frequency being off-set from said first carrier frequency substantially by said intermediate frequency.

14. Navigational radio means for transmitting and receiving coded carrier pulse trains, wherein the predetermined presence or absence of successive pulses in each said coded pulse train conveys a total message of predetermined duration, comprising:

transmitter activation means, transmitter means for successively transmitting said coded carrier pulse train in response to said transmitter activation means over a space path to remotely located transponder means, receiver means responsive only to said coded carrier pulse train upon retransmission thereof by said remotely located transponder means, pulse generator means for generating a train of regular pulses, first counter means for initiating a count of said regular pulses in response to the completed transmission by said transmitter means of each said coded carrier pulse train, delay means responsive to said receiver means having a delay period at least as great as said predetermined message duration for stopping the count of said regular pulses by said first counter means in response to the successful response by said receiver means of each said retransmitted coded carrier pulse train for incrementally storing in said first counter means a measure of the length of the round trip transmission time of each said successfully received coded carrier pulse train, second counter means for counting the number of successive responses by said receiver means only to said received coded carrier pulse trains, divider means responsive to said second counter means for diving the count stored in said first counter by the count stored in said second counter, and average range display means responsive to said divider means.

15. Apparatus as described in claim 14 including means responsive to a succeeding operation of said transmitter activation means for clearing said average range display means.

16. Navigational radio repeater means responsive to a carrier pulse train, wherein the predetermined presence or absence of predetermined successive pulses conveys a message of predetermined time duration, comprising:

receiver means responsive to said carrier pulse train, transmitter means, decoder means responsive to said receiver means in the presence of said message comprising multiple element delay means and having first and second ends and having:

first output coupling means at predetermined ones of said delay elements responsive to the presence thereat of first predetermined elements of said message, second output coupling means at other predetermined ones of said delay elements responsive to the absence thereat of second predetermined elements of said message, and coincidence gate means responsive to said first and second output coupling means, transmission delay means responsive to said coincidence gate means, and delayed gate means responsive to said transmission delay means for conducting a predetermined portion of said message from said second end of said multiple element delay means for retransmission by said transmitter means.

17. Apparatus as described in claim 16 wherein:

said transmitter means includes transmitter circuit means for generation of a second carrier frequency, and said receiver means includes receiver circuit means having a predetermined intermediate pass band, said second carrier frequency being off-set from said first carrier frequency substantially by said intermediate frequency.

18. Apparatus as described in claim 17 wherein said receiver means additionally includes in series connection:

receiver detector means, and pulse threshold means.

19. Apparatus as described in claim 16 wherein said repeater means includes oscillator means for supplying carrier frequency signals to said receiver means and to said transmitter means.

20. Apparatus as described in claim 16 wherein said second output coupling means includes inverter means.

21. Apparatus as described in claim 16 for cooperative operation between a called station having a first identifying code and a calling station having a second identifying code, wherein said delay means comprises in serial relation:

first delay section means comprising delay elements responsive to a third code identifying the mode of calling of said calling station, second delay section means comprising delay elements responsive to said first identifying code, and third delay section means comprising delay elements responsive to said second identifying code.

22. Apparatus as described in claim 21 wherein said coincidence gate means is responsive at least to said second and third delay section means.

23. Navigational radio means for transmitting a carrier pulse train, wherein the predetermined presence or absence of successive pulses in said carrier pulse train conveys a total message of predetermined length, said total message being composed of successive sub-messages, comprising:

transmitter means including frequency shiftable oscillator means responsive to pulse generator activation means for shifting said shiftable oscillator means operating carrier frequency from a normal value to a value off-set therefrom during transmission of said total message, pulse generator means for generating in response to said pulse generator activation means a synchronizing pulse train, delay means having successive series-connected sections forming a signal propagation path for each said pulse of said synchronizing pulse train, plural encoding means respectively coupled to said respective sections of said signal propagation path for generating a corresponding plurality of respective coded sub-message in time succession, and coincidence means responsive to said plural encoding means and to said pulse generator activation means for permitting said total message to be transmitted by said transmitter means.

* * * * *